(12) United States Patent
Byron et al.

(10) Patent No.: US 11,017,312 B2
(45) Date of Patent: May 25, 2021

(54) EXPANDING TRAINING QUESTIONS THROUGH CONTEXTUALIZING FEATURE SEARCH

(71) Applicant: International Business Machines Corporation, Armonk, NY (US)

(72) Inventors: Donna K. Byron, Petersham, MA (US); Alexander Pikovsky, Lexington, MA (US); Mary D. Swift, Rochester, NY (US)

(73) Assignee: International Business Machines Corporation, Armonk, NY (US)

( * ) Notice: Subject to any disclaimer, the term of this patent is extended or adjusted under 35 U.S.C. 154(b) by 1695 days.

(21) Appl. No.: 14/573,240

(22) Filed: Dec. 17, 2014

(65) Prior Publication Data
US 2016/0180242 A1 Jun. 23, 2016

(51) Int. Cl.
*G06N 20/20* (2019.01)
*G06N 20/00* (2019.01)
*G06N 5/04* (2006.01)

(52) U.S. Cl.
CPC ............. *G06N 20/00* (2019.01); *G06N 5/041* (2013.01)

(58) Field of Classification Search
CPC .................. G06N 99/005; G06N 5/022; G06F 17/30654; G06F 17/2785; G06F 17/30684
See application file for complete search history.

(56) References Cited

U.S. PATENT DOCUMENTS

| | | | |
|---|---|---|---|
| 7,756,800 B2 | 7/2010 | Chidlovskii | |
| 7,870,117 B1 * | 1/2011 | Rennison | G06F 17/3066 707/706 |
| 7,873,624 B2 * | 1/2011 | Agichtein | G06F 17/30398 707/708 |
| 8,346,792 B1 * | 1/2013 | Baker | G06F 17/30389 707/759 |
| 8,543,565 B2 | 9/2013 | Feng | |

(Continued)

OTHER PUBLICATIONS

Agichtein, Eugene et al., "Question Answering over Implicitly Structured Web Content", In Proceedings of the 2007 IEEE/WIC/ACM International Conference on Web Intelligence, Nov. 2007, 8 pages.

(Continued)

*Primary Examiner* — Kamran Afshar
*Assistant Examiner* — Ying Yu Chen
(74) *Attorney, Agent, or Firm* — Stephen J. Walder, Jr.; Diana B. Gerhardt

(57) ABSTRACT

Mechanisms for training a Question and Answer (QA) system are provided. The QA system receives a training question for processing by the QA system and processes the training question to generate an answer to the training question, from a portion of content. The QA system identifies a repeatable pattern of content present in the portion of content in association with the answer to the training question. The QA system applies the repeatable pattern of content to other portions of content to generate at least one additional training question and at least one additional entry in a ground truth data structure to thereby expand a set of training questions and expand the ground truth data structure. The QA system is then trained using the expanded set of training questions and expanded ground truth data structure.

19 Claims, 6 Drawing Sheets

(56) References Cited

U.S. PATENT DOCUMENTS

| | | | |
|---|---|---|---|
| 8,612,373 B2 | 12/2013 | Chidlovskii | |
| 8,645,391 B1 | 2/2014 | Wong | |
| 2006/0173834 A1* | 8/2006 | Brill | G06F 17/30554 |
| 2006/0235689 A1* | 10/2006 | Sugihara | G06F 17/2785 |
| | | | 704/257 |
| 2007/0022099 A1* | 1/2007 | Yoshimura | G06F 17/30654 |
| 2007/0196804 A1* | 8/2007 | Yoshimura | G09B 7/02 |
| | | | 434/323 |
| 2008/0195378 A1 | 8/2008 | Nakazawa et al. | |
| 2009/0162824 A1* | 6/2009 | Heck | G06Q 10/10 |
| | | | 434/322 |
| 2009/0287678 A1 | 11/2009 | Brown et al. | |
| 2009/0292687 A1* | 11/2009 | Fan | G06F 17/30654 |
| 2011/0066587 A1 | 3/2011 | Ferrucci et al. | |
| 2011/0125734 A1 | 5/2011 | Duboue et al. | |
| 2012/0041950 A1* | 2/2012 | Koll | G09B 7/02 |
| | | | 707/728 |
| 2013/0007055 A1 | 1/2013 | Brown et al. | |
| 2013/0018652 A1 | 1/2013 | Ferrucci et al. | |
| 2013/0066886 A1 | 3/2013 | Bagchi et al. | |
| 2013/0226846 A1 | 8/2013 | Li et al. | |
| 2014/0046947 A1 | 2/2014 | Jenkins et al. | |

OTHER PUBLICATIONS

Cucerzan, Silviu et al., "Factoid Question Answering over Unstructured and Structured Web Content", Proceedings of the Fourteenth Text Retrieval Conference (TREC 2005), National Institute of Standards and Technology (NIST), Nov. 15-18, 2005, 6 pages.

High, Rob, "The Era of Cognitive Systems: An Inside Look at IBM Watson and How it Works", IBM Corporation, Redbooks, Dec. 12, 2012, 16 pages.

McCord, M.C. et al., "Deep parsing in Watson", IBM J. Res. & Dev. vol. 56 No. 3/4 Paper 3, May/Jul. 2012, pp. 3:1-3:15.

Ramprasath, Muthukrsihanan et al., "Improving QA performance through semantic reformulation", 2012 Nirma University International Conference on Engineering (NUiCONE) 2012, Dec. 6-8, 2012, pp. 1-4.

Yuan, Michael J., "Watson and healthcare, How natural language processing and semantic search could revolutionize clinical decision support", IBM developerWorks, IBM Corporation, Apr. 12, 2011, 14 pages.

* cited by examiner

List of Chief Executive Officers

From the Free Encyclopedia

The following is a list of chief executive officers (CEOs) of notable companies.

| <u>410</u> | <u>420</u> | <u>430</u> | <u>440</u> | | |
|---|---|---|---|---|---|
| ACCENTURE | PIERRE NANTERME | CHAIRMAN AND CEO | 2011 | ESSEC | ... |
| ACE LIMITED | EVAN GREENBERG | CHAIRMAN, PRESIDENT, AND CEO | 2004 | NEW YORK UNIVERSITY, COLLEGE OF INSURANCE | ... |
| ADITYA BIRLA GROUP | KUMAR BIRLA | CHAIRMAN | 1995 | | ... |
| ADOBE SYSTEMS | SHANTANU NARAYEN | PRESIDENT AND CEO | 2007 | OSMANIA UNIVERSITY, BOWLING GREEN STATE | ... |
| AGENUS | GARO H. ARMEN | FOUNDER, CHAIRMAN, CEO | 1994 | CITY UNIVERSITY OF NEW YORK | ... |
| ... | ... | ... | ... | ... | ... |

*FIG. 4*

Organizations
- *Altura Credit Union*, a credit union in California
- *American Conservative Union*, a political lobbying group in the US
- *Arab Customs Union*, an organization under the Arab League for a Customs Union between Arab Members of the League
- *Asian Clearing Union*, an organization that settles international payments between member countries
- *Assiniboine Credit Union*, a credit union in Manitoba
- *Acu Publishing*, an imprint of the German group VDM Publishing devoted to the reproduction of Wikipedia content
- *Auto-Cycle Union*, is the governing body of motorcycle sport in Great Britain

Military
- *Assault Craft Unit*, military units of the US Navy that specialize in amphibious warfare
- Army Combat Uniform, the combat uniform worn by the US Army

Transportation Related
- *Achutupo Airport*, an airport in Achutupo, Panama with the IATA airport code "ACU"
- *Auto-Cycle Union*, an officially recognized motorcycle governing body in the United Kingdom
- *Automovil Club de Uruguay*, a member of the Federation Internationale de l'Automobile

Geography
- *Acu*, municipality in the state of Rio Grande do Norte, Brazil
- *Acu River*, another name for the Piranhas River in Brazil
- *Pariguera-Acu*, a municipality in the state of Sao Paulo, Brazil

*FIG. 5*

EXPANDING TRAINING QUESTIONS THROUGH CONTEXTUALIZING FEATURE SEARCH

BACKGROUND

The present application relates generally to an improved data processing apparatus and method and more specifically to mechanisms for expanding training questions through contextualizing feature search.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

Examples, of QA systems are Siri® from Apple®, Cortana® from Microsoft®, and the IBM Watson™ system available from International Business Machines (IBM®) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

SUMMARY

In one illustrative embodiment, a method, in a data processing system having a processor and a memory and implementing a Question and Answer (QA) system, for training the QA system is provided. The method comprises receiving, by the QA system, a training question for processing by the QA system and processing, by the QA system, the training question to generate an answer to the training question, from a portion of content in a corpus of information. The method further comprises identify, by the QA system, a repeatable pattern of content present in the portion of content in association with the answer to the training question. The method also comprises applying, by the QA system, the repeatable pattern of content to other portions of content to generate at least one additional training question and at least one additional entry in a ground truth data structure to thereby expand a set of training questions and expand the ground truth data structure. Moreover, in some illustrative embodiments, the method comprises training the QA system using the expanded set of training questions and expanded ground truth data structure.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 shows an example portion of content that may be present in a corpus of information and which may be used to generate an answer to a training question in accordance with one illustrative embodiment;

FIG. 5 is an example diagram of another type of portion of content in which a repeatable pattern is discernable in association with an identified answer to a training question in accordance with one illustrative embodiment.

DETAILED DESCRIPTION

Figure 1:
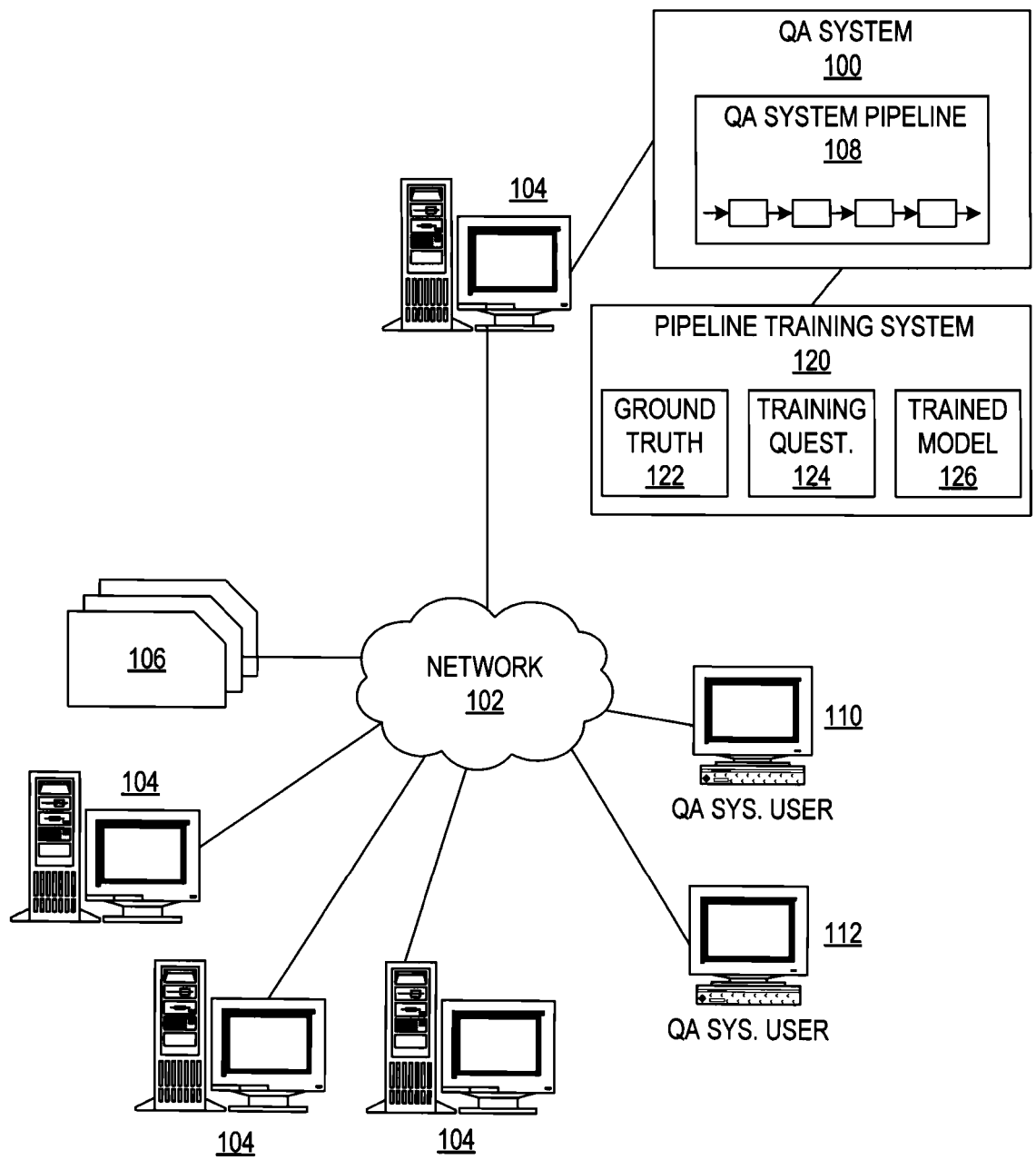
FIG. 1 depicts a schematic diagram of one illustrative embodiment of a question/answer creation (QA) system in a computer network.

The illustrative embodiments provide mechanisms for expanding training questions through contextualizing feature searches. Currently, developing a set of question and answer pairs for a Question and Answer (QA) system is a time-consuming manual process that relies heavily on the individual person's own knowledge of the domain and the training goals for the QA system. This manual process involves finding the answer to a particular question within a corpus of information and marking that answer using a ground truth collection tool which compiles these answers into one or more ground truth data structures used for training the QA system. Thus, the creating of such ground truth data structures and the subsequent training of the QA system represents a large investment for providers of such QA systems.

With the mechanisms of the illustrative embodiments, when generating a ground truth data structure, an annotator (which may be a human annotator such as a Subject Matter Expert or automated logic of a computer system) is utilized to annotate a portion of a corpus of information, e.g., one or more documents, with annotations indicating answers to training questions. That is, when processing a question by a QA system, the QA system mechanisms perform natural language processing (NLP) on the question to extract features, generate queries based on the extracted features, and apply the queries to the corpus of information to obtain portions of the corpus that potentially contain answers to the question based on the queries that are applied. Either manually or automatically, candidate answers are identified from the portions of the corpus. For example, in processing the question, a document may be identified from the corpus based on the application of the queries. The document may be manually inspected by a Subject Matter Expert (SME) to determine whether an actual answer to the question is present in the document. Alternatively, an automated mechanism may be utilized to analyze the document and identify a candidate answer in the document, score the candidate answer against evidential data in the corpus of information, and determine whether the candidate answer should be considered an actual answer to the input question. The automatically generated candidate answers may be output to a ground truth generation engine that presents the candidate answers to a SME who then verifies which candidate answer(s) is/are correct candidate answers for the input question, thereby generating one or more question/answer pairs. In the case of the manual identification of answers in the document, the SME has already verified the answer and thus, the ground truth generation engine may generate the question/answer pair for that question/answer combination.

Having identified a question/answer pair that is correct for the input question, the mechanisms of the ground truth generation engine then searches the portion of content, in which the answer is present, for a repeatable pattern of content that can be exploited to generate additional question/answer pairs. Examples of such repeating patterns of content (e.g., repeatable contexts) include tabular data, lists/bulleted data, and outlined data with headings and subheadings. If such a repeatable pattern is found, the structure of the repeatable pattern is used to automatically identify sibling elements and question/answer pairs are generated for each sibling of the repeatable pattern.

In generating the sibling question/answer pair entries in the ground truth table, the input question is used to generate a training question to be added to the set of training questions used to train the QA system. The question is formulated using the input question as a template to generate the additional training questions whose answers are the answers specified by the corresponding question/answer pair entry in the ground truth data structure. In some illustrative embodiments, an SME or other user is requested to map portions of the repeatable elements of the repeatable pattern to fields within the question template. The resulting template is used to automatically generate question and answer pairs from the content of the corpus by populating the fields of the template with information from the corpus and correlating the resulting question with an identified answer within the corpus. As a result, sibling question/answer pairs are thereby generated for inclusion in the ground truth data structure.

The identified sibling question/answer pairs that follow the same repeatable pattern may be automatically or semi-automatically added to the ground truth table data structure and used to expand the set of training questions for training the QA system. With an automated implementation, no additional verification is utilized before automatically creating an entry into the ground truth table data structure for the question/answer pair. In a semi-automated implementation, the sibling question/answer pairs may be presented to a SME or other human user for verification before adding the corresponding entry to the ground truth table data structure. That is, human beings are much better at verifying a relationship than identifying relationships ahead of time within a corpus of information. Thus, even though a human being may be involved in verification, the efficiency of the process is still improved due to the lessening of the burden on the human being with regard to identifying the question/answer pairs from within the corpus of information. All the human being needs to do is respond to a presented sibling question/answer pair with an input confirming or rejecting the sibling question/answer pair as a valid question/answer pair. If the human being verifies the question/answer pair, it is added as an entry into the ground truth data structure. If the human being does not verify the question/answer pair, it is discarded.

Thus, additional question/answer pairs are generated and added to the ground truth table data structure in an automated or semi-automated manner rather than having to have a SME manually enter, or identify within the corpus, all of the question/answer pairs that may be used for training the QA system. That is, the SME need only identify the first question/answer pair of a question/answer pair associated with a repeatable pattern within the corpus of information and additional question/answer pairs associated with that same repeatable pattern will be automatically or semi-automatically identified and added to the ground truth table data structure. Thus, the ground truth table data structure is automatically expanded with additional question/answer pairs which expands the training question set that may be utilized to train the QA system.

Before beginning the discussion of the various aspects of the illustrative embodiments in greater detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
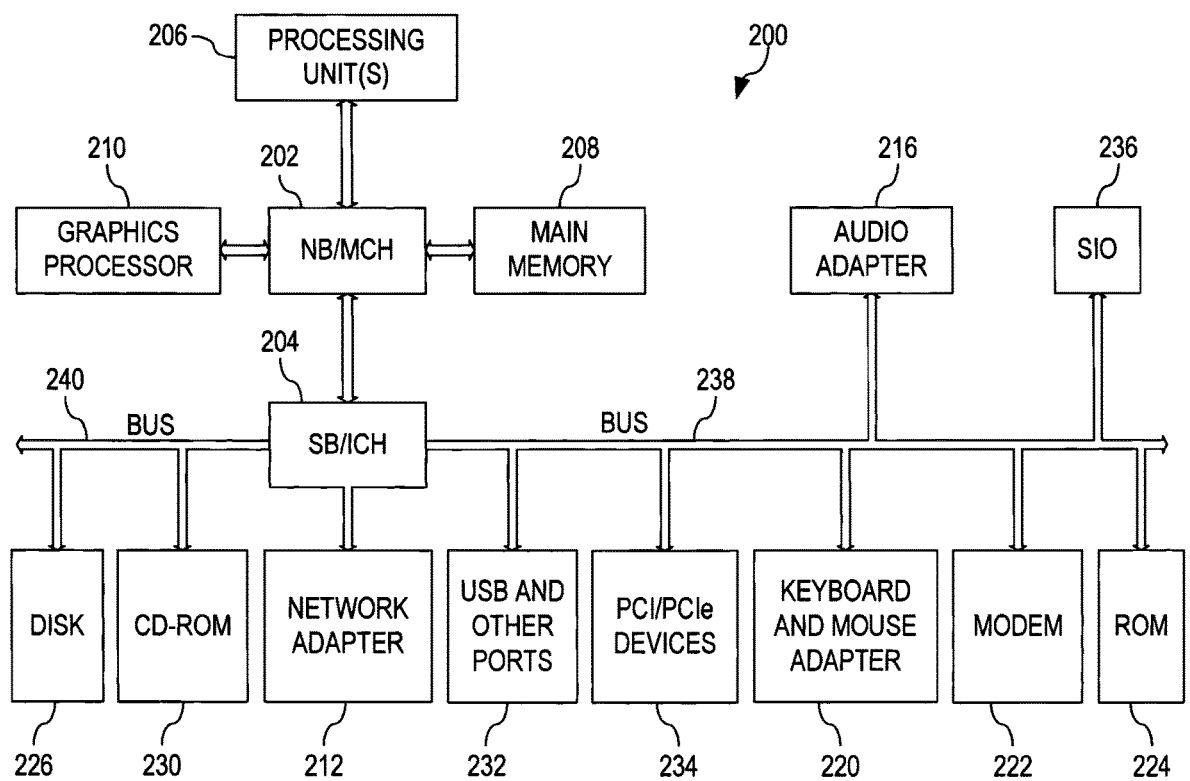
FIG. 2 is a block diagram of an example data processing system in which aspects of the illustrative embodiments are implemented.
Figure 3:
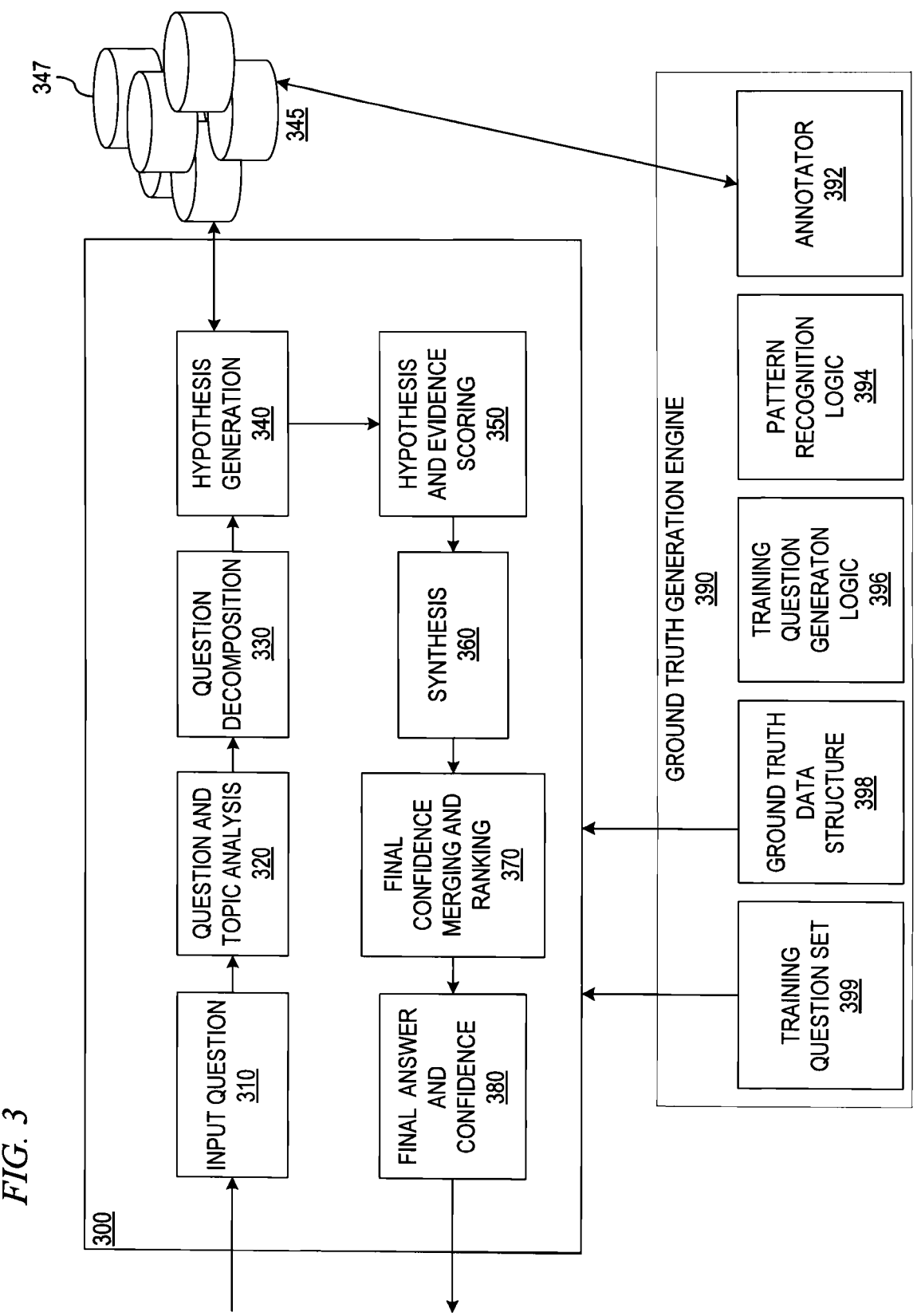
FIG. 3 illustrates a QA system pipeline for processing an input question in accordance with one illustrative embodiment.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1-3 are directed to describing an example Question Answering (QA) system (also referred to as a Question/Answer system or Question and Answer system), methodology, and computer program product with which the mechanisms of the illustrative embodiments are implemented. As will be discussed in greater detail hereafter, the illustrative embodiments are integrated in, augment, and extend the functionality of these QA mechanisms with regard to automatic or semi-automatic expansion of a ground truth data structure for use in training the QA system. Thus, it is important to first have an understanding of how question and answer creation in a QA system is implemented before describing how the mechanisms of the illustrative embodiments are integrated in and augment such QA systems. It should be appreciated that the QA mechanisms described in FIGS. 1-3 are only examples and are not intended to state or imply any limitation with regard to the type of QA mechanisms with which the illustrative embodiments are implemented. Many modifications to the example QA system shown in FIGS. 1-3 may be implemented in various embodiments of the present invention without departing from the spirit and scope of the present invention.

As an overview, a Question Answering system (QA system) is an artificial intelligence application executing on data processing hardware that answers questions pertaining to a given subject-matter domain presented in natural language. The QA system receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA system. The document may include any file, text, article, or source of data for use in the QA system. For example, a QA system accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to the QA system which then answers the input questions using the content in the corpus of data by evaluating documents, sections of documents, portions of data in the corpus, or the like. When a process evaluates a given section of a document for semantic content, the process can use a variety of conventions to query such document from the QA system, e.g., sending the query to the QA system as a well-formed question which are then interpreted by the QA system and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA system receives an input question, parses the question to extract the major features of the question, uses the extracted features to formulate queries, and then applies those queries to the corpus of data. Based on the application of the queries to the corpus of data, the QA system generates a set of hypotheses, or candidate answers to the input question, by looking across the corpus of data for portions of the corpus of data that have some potential for containing a valuable response to the input question. The QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA system. The statistical model is used to summarize a level of confidence that the QA system has regarding the evidence that the potential response, i.e. candidate answer, is inferred by the question. This process is repeated for each of the candidate answers until the QA system identifies candidate answers that surface as being significantly stronger than others and thus, generates a final answer, or ranked set of answers, for the input question.

As mentioned above, QA systems and mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, annotate or otherwise generate metadata for providing information useable by the QA system to identify these question and answer attributes of the content.

Operating on such content, the QA system generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. The QA system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The QA system 100 and network 102 enables question/answer (QA) generation functionality for one or more QA system users via their respective computing devices 110-112. Other embodiments of the QA system 100 may be used with components, systems, sub-systems, and/or devices other than those that are depicted herein.

The QA system 100 is configured to implement a QA system pipeline 108 that receive inputs from various sources. For example, the QA system 100 receives input from the network 102, a corpus of electronic documents 106, QA system users, and/or other data and other possible sources of input. In one embodiment, some or all of the inputs to the QA system 100 are routed through the network 102. The various computing devices 104 on the network 102 include access points for content creators and QA system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the QA system 100 may operate in environments of any size, including local and global, e.g., the Internet.

In one embodiment, the content creator creates content in a document of the corpus of data 106 for use as part of a corpus of data with the QA system 100. The document includes any file, text, article, or source of data for use in the QA system 100. QA system users access the QA system 100 via a network connection or an Internet connection to the network 102, and input questions to the QA system 100 that are answered by the content in the corpus of data 106. In one embodiment, the questions are formed using natural language. The QA system 100 parses and interprets the question, and provides a response to the QA system user, e.g., QA system user 110, containing one or more answers to the question. In some embodiments, the QA system 100 provides a response to users in a ranked list of candidate answers while in other illustrative embodiments, the QA system 100 provides a single final answer or a combination of a final answer and ranked listing of other candidate answers.

The QA system 100 implements a QA system pipeline 108 which comprises a plurality of stages for processing an input question and the corpus of data 106. The QA system pipeline 108 generates answers for the input question based on the processing of the input question and the corpus of data 106. The QA system pipeline 108 will be described in greater detail hereafter with regard to FIG. 3.

In some illustrative embodiments, the QA system 100 may be the IBM Watson™ QA system available from International Business Machines Corporation of Armonk, N.Y., which is augmented with the mechanisms of the illustrative embodiments described hereafter. As outlined previously, the IBM Watson™ QA system receives an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The IBM Watson™ QA system then performs deep analysis on the language of the input question and the language used in each of the portions of the corpus of data found during the application of the queries using a variety of reasoning algorithms. The scores obtained from the various reasoning algorithms are then weighted against a statistical model that summarizes a level of confidence that the IBM Watson™ QA system has regarding the evidence that the potential response, i.e. candidate answer, is inferred by the question. This process is be repeated for each of the candidate answers to generate ranked listing of candidate answers which may then be presented to the user that submitted the input question, or from which a final answer is selected and presented to the user. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

As shown in FIG. 1, in accordance with the mechanisms of the illustrative embodiments, a pipeline training system 120 is provided that operates to train the QA system pipeline 108 and generate a trained model 126 for use by the QA system pipeline 108 during runtime operation. In training the QA system pipeline 108, the pipeline training system 120 implements logic (hardware, software executed on hardware, or a combination of software and hardware) for automatically or semi-automatically expanding the ground truth data structure 122 and training question set 124. That is, as will be described in greater detail hereafter, given a seed training question and corresponding question/answer pair in the ground truth data structure 122, the pipeline training system 120 implements ground truth and training question generation logic that looks for repeatable patterns in the content of a corpus upon which the QA system pipeline 108 operates to thereby identify additional question/answer pairs that may be automatically or semi-automatically added to the ground truth data structure 122 and training question set 124. The seed training question as well as the identified repeatable pattern itself may be used to generate templates for specifying new training questions and question/answer pairs for use in expanding the training questions and ground truth used to train the QA system pipeline 108.

In one illustrative embodiment, the expansion of the ground truth data structure (or simply the "ground truth") 122 starts with an input question Q that is to be the basis for developing an answer key entry or entries. The question Q is processed by a portion of the QA system pipeline 108 to parse the question, extract features from the question Q, and generate queries that are applied against a corpus to retrieve portions of the corpus where it is determined that an answer to the question is likely to reside. The portions of the corpus may be further analyzed to identify potential candidate answers for the input question Q through an automated analysis of the portion of the corpus using the QA system pipeline 108 in the manner described hereafter, or may be analyzed manually by a SME, in response to an output of the portion of the corpus, to determine whether the answer to the input question is present in the portion of the corpus and mark it accordingly. Whether using an automated mechanism or a SME to identify one or more correct answers in the portion of corpus, the result is a portion of the corpus, e.g., a document, where one or more answers, A_1 to A_n, to the input question Q are identified and marked electronically as being answers to the input question Q.

Once the human/automated annotator identifies/marks one or more correct answers (A_1 to A_n) to the input question Q within the portion of the corpus (hereafter assumed to be a "document" for ease of explanation, however it should be appreciated that any portion of text may be considered the portion of the corpus), one or more question Q and answer A_1 to A_n pairs are generated. Thereafter, the pipeline training system 120 is invoked to discover whether additional novel question/answer pairs can be induced from the same document (portion of the corpus) for adding to the answer key (ground truth 122). The discovering of additional novel question/answer pairs is based on the identification of a repeatable pattern within the document that can be exploited to identify other potential question/answer pairs that are specified using the same pattern within the document.

In one illustrative embodiment, rules are established in the pipeline training system 120 based on a document type, which are used to discover document layout features that indicate the selected answer is within a repeating group context. For example, within a HyperText Markup Language (HTML) marked-up document of a corpus, the document type rules are used to examine elements subsuming the marked answer to identify repeated group elements, such as table data structures, for example. For example, in an HTML document, a table container has repeating elements formatted as table rows that can be identified by navigating the document object model (DOM) for particular tags such as <table> or <tr>. Another possible repeated pattern container within an HTML document is a list element, which has repeated elements indicated by the list item layout tag. Those skilled in the art will recognize that the particular types of layout markup will vary depending on the document format used. For example, Portable Document Format (PDF) or Microsoft Word™ word processor formatted documents utilize different tags and metadata. Moreover, the types of repeating element groups to be discovered within the document may include, but is not be limited to: tabular data, itemized lists, chart element labels, JavaScript Object Notation (JSON) element arrays, or the like.

Once a candidate repeated pattern, e.g., a repeated pattern container, is isolated, each element in a parallel position to the original marked answer is selected as a potential additional answer. For example, if the original marked answer is in a particular column within a tabular data layout, values from all the other cells within that column are selected as additional answers to parallel questions, subject to verification. The verification of this set of additional answers can employ a variety of methods such as bayesian reasoning or ontology based reasoning to infer the semantic type of the novel answers, and evaluate whether a sufficient number of the parallel elements are judged to be of an acceptable semantic type. Both the semantic type of the originally marked answer and additional semantic features, such as the lexical answer type (LAT) of the input question Q, may be used in this comparison. For example, if the originally marked answer is found to be a PERSON type answer, semantic verification may check whether a sufficient quantity of other cell values in the column are also of a PERSON type, or one of the subtypes associated with a PERSON type. Various techniques may be utilized to perform this semantic analysis, including techniques such as named entity type tagging and bayesian classification. Alternatively, the human SME may validate semantic acceptability of the proposed novel answers.

The type of an entity, such as PERSON or DATE, is assigned to the original marked answer and a candidate repeated element structure is checked for its semantic compatibility with the marked answer. If a sufficient quantity (using for example a threshold percent as the sufficiency condition) of parallel elements within the repeatable pattern, e.g., the repeated pattern container, are found to be semantically compatible, then each parallel element is retained as part of a set of novel answers from which additional question/answer pairs may be generated. The process then proceeds to define/generate/construct the respective question that is associated with each novel answer.

Generating questions to which each novel answer is a correct response proceeds in an analogous fashion, using elements of both the marked answer (A_n) and the question (Q). The question string of the input question Q is searched for additional relation terms that are also present within the document context where A_n was marked. For example, a question "Who is the CEO of IBM?" may have an answer found on an HTML page that presents information in a tabular format containing many CEO names and their associated company name. When the CEO name is marked as an answer, the pipeline training system 120 examines the structure of the document using document tags or other metadata, as discussed above, to discover a structural relation between the document element containing the answer A_n and the document element containing one or more additional terms associated with the input question Q. An example structural relation is, for example, "shift 2 columns to the left within the table element on the same row as the cell containing A_n."

In one illustrative embodiment, the pipeline training system 120 may then verify that applying that same structural relation to each element within the additional induced novel answer set produces a related term for each that is semantically compatible to the additional term in the input question Q, in this particular example, a company name. If an above-threshold number of elements found by applying the same structural relation for each novel answer are semantically acceptable, a set of relation tuples is created, and each relation tuple is used to construct the set of novel questions that are associated with each novel answer. Following the same example above, the additional term in the sample question that forms the CEO relation, namely the string "IBM," is identified in another column of the same row of the table. The identification process allows for name variants (such as the full form of the name), synonyms, and other meaning-preserving lexical variations. This step then populates a vector of harvested relations such as CEO/Virginia Rometty/IBM, CEO/Pierre Nanterme/Accenture, and the like.

The tuples can additionally be enriched with additional details, for example additional predicates from the same row of the table which may include dates, etc. The allowable set of structural relations that derive these predicates from the repeated pattern may be encoded as rule-based processes or can be learned via over-generate and prune techniques, where the pruning operation applies the semantic validation described above. The tuples are then transformed into natural language questions via either a fully automated or human-assisted process. This natural language question generation operation may require human intervention to map elements from the tuples into the representation required for input into the natural language generation engine, for example, specifying the verbs "became," "has been," and "was selected" as desired variants for expressing a relation such as Pierre Nanterme/CEO/Accenture/2011. Alternately, the original input question Q can be generated and used as a template to plug in the parallel elements from each novel tuple.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which, which implements a QA system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline for processing an input question in accordance with one illustrative embodiment. It should be noted that the illustrative embodiments utilize a portion of the QA system pipeline to identify portions of a corpus where an answer to an input question for generating ground truth data structure entries is likely to be found. The portions of the corpus may then be evaluated by a SME to determine whether actual answers to the input question are present in the portions of the corpus and the portions of the corpus may be marked accordingly for use in generating question Q/answer A pairs or other tuples for use in generating entries in a ground truth data structure. In some illustrative embodiments, rather than requiring interaction with a SME, portions of the QA system pipeline for generating candidate answers for the input question may also be utilized to automatically identify correct answers to the input question for purposes of generating entries in a ground truth data structure. The additional mechanisms of the illustrative embodiments for identifying additional entries in the ground truth data structure based on an identified repeatable pattern within the portion of the corpus may be implemented to generate such entries and thus, expand the ground truth data structure. The expanded ground truth data structure may then be used to train the QA system pipeline 300. Thus, the operation of the QA system pipeline 300 will first be described followed by a description of the additional elements of the illustrative embodiments used to generate the expanded ground truth data structure and train the QA system pipeline 300.

The QA system pipeline of FIG. 3 may be implemented, for example, as QA system pipeline 108 of QA system 100 in FIG. 1. It should be appreciated that the stages of the QA system pipeline shown in FIG. 3 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA system pipeline of FIG. 3 is augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA system pipeline 300 comprises a plurality of stages 310-380 through which the QA system operates to analyze an input question and generate a final response. In an initial question input stage 310, the QA system receives an input question that is presented in a natural language format. That is, a user inputs, via a user interface, an input question for which the user wishes to obtain an answer, e.g., "Who are Washington's closest advisors?" In response to receiving the input question, the next stage of the QA system pipeline 300, i.e. the question and topic analysis stage 320, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of ADD with relatively few side effects?," the focus is "drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 3, the identified major features are then used during the question decomposition stage 330 to decompose the question into one or more queries that are applied to the corpora of data/information 345 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 345. That is, these various sources themselves, different collections of sources, and the like, represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries are applied to one or more databases storing information about the electronic texts, documents, articles, websites, and the like, that make up the corpus of data/information, e.g., the corpus of data 106 in FIG. 1. The queries are applied to the corpus of data/information at the hypothesis generation stage 340 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA system pipeline 300, in stage 350, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In generally, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexity may be used to generate scores for candidate answers and evidence without departing from the spirit and scope of the present invention.

In the synthesis stage 360, the large number of scores generated by the various reasoning algorithms are synthesized into confidence scores or confidence measures for the various hypotheses. This process involves applying weights to the various scores, where the weights have been determined through training of the statistical model employed by the QA system and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question. In accordance with the illustrative embodiments, the training of the QA system may be based on the expanded ground truth data structure generated based on the identification of repeatable patterns in the corpus as described herein.

The resulting confidence scores or measures are processed by a final confidence merging and ranking stage 370 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, are generated and output to the submitter of the original input question via a graphical user interface or other mechanism for outputting information.

As discussed above, the illustrative embodiments provide mechanisms for automatically or semi-automatically expanding the ground truth data structure and training question set used to train the QA system pipeline 300. That is, prior to runtime operation of the QA system pipeline 300, or at periodic times thereafter when retraining of the QA system pipeline 300 is determined to be appropriate, a set of training questions are submitted to the QA system pipeline 300 and are processed by the QA system pipeline 300 to generate a set of candidate answers and/or final answer with corresponding confidence measure values. The candidate answers and/or final answer are compared to a ground truth data structure to identify whether the candidate answers and/or final answer match corresponding entries in the ground truth data structure that correspond to the training question being processed. Based on the comparison, a trained model is generated that includes the weights to be applied to various annotators implemented in the QA system pipeline 300 to thereby adjust their operation or the values generated by the annotators for evaluating the candidate answers and generating their corresponding confidence measure values.

With the mechanisms of the illustrative embodiments, when generating a ground truth data structure for use in such training and generation of a trained model to be used by the QA system pipeline 300 during runtime, an annotator 392, of a ground truth generation engine 390, is utilized to annotate a portion of content in the corpus of information with annotations indicating answers to training questions. That is, when processing a training question by a QA system in the manner described above, and the candidate answers and final answer are generated, the candidate answers and final answer may further be output to the ground truth generation engine 390 that presents the candidate answers to a Subject Matter Expert (SME) who then verifies, through user input, which candidate answer(s) is/are correct candidate answers for the input question, thereby generating one or more question/answer pairs. The annotator 392 then annotates the portion of content in the corpus of information where the corresponding candidate answer was found to specify the answer to the question as well as elements of the question that are present in the portion of content.

Alternatively, rather than using an automated annotator 392, the QA system pipeline 300 may identify the portions of the corpus where answers to an input question 310 are likely to be present and then present these portions of the corpus to a human SME for evaluation, such as via a graphical user interface (GUI). The human SME may then mark answers in the portions of the corpus where correct answers to the input question 310 are present. In such a situation, the SME need not verify the marked answers since the SME marked the answers himself/herself.

Having identified a question/answer pair that is correct for the input question, the pattern recognition logic 394, of the ground truth generation engine 390 then searches the portion of content, in which the answer is present, for a repeatable pattern of content that can be exploited to generate additional question/answer pairs. Examples of such repeating patterns of content (e.g., repeatable contexts) include tabular data, lists/bulleted data, and outlined data with subheadings.

For example, as noted above, once the human/automated annotator identifies/marks one or more correct answers to the input question 310 within the portion of the corpus (e.g., a document), one or more question and answer pairs (Q/A) are generated in the ground truth data structure 398. Thereafter, the pattern recognition logic 394 is invoked to discover whether additional novel question/answer pairs can be induced from the same document for adding to the ground truth data structure 398 based on the identification of a repeatable pattern within the document. In some illustrative embodiments, this involves the use of document type based rules for identifying structural/layout relationships between portions of the repeatable pattern. These structural/layout relationships may be based on metadata associated with the document, e.g., tags or the like. Applying these rules by the pattern recognition logic 394 to the document (or portion of the corpus 347) in which the answer to the input question 310 is found, indicates whether such a repeatable pattern exists in the document and further identifies what this pattern is so that it may be applied for generation of additional question/answer pairs (or tuples).

If such a repeatable pattern, or repeated pattern container, is found by the pattern recognition logic 394, the structure of the repeatable pattern is used to automatically identify elements for sibling answers as well as elements for populating a question template identified from the initial training question. For example, as discussed above, each element of a repeated pattern container, in a parallel position to the original marked answer is selected as a potential additional answer and verified through either automated, semi-automated, or manual processes. Those parallel elements of the repeated pattern container that are verified may be selected for inclusion in a set of answers for use in generating additional question/answer pairs or tuples.

The training question generation logic 396 operates on this set of answers to generate training questions that correspond to the answers in the set of answers, i.e. generates questions for which an answer in the set of answers is a correct answer. As mentioned above, the generation of questions based on the set of answers may be performed in an analogous fashion to that of the generation of the answers themselves by using elements of both the original marked answer and the input question 310. The question string of the input question 310 may be searched for additional relation terms that are also present within the document context where the original marked answer appears. The structure of the document at the location of the original marked answer may be analyzed by the training question generation logic 396 using document tags or other metadata, as discussed above, to discover a structural relation between the document element containing the originally marked answer and the document elements containing one or more additional terms associated with the input question 310. The structural relation may then be verified that applying it to the each element within the set of answers produces a related term for each answer that is semantically compatible to the additional term in the input question 310. If a sufficiently high enough set of such applications of the structural relation result in a positive outcome, e.g., a threshold number of instances or more indicate the application of the structural relation generates a correct result, then a set of relation tuples is created for use in generating a set of novel questions that are associated with each novel answer. The tuples can further include additional details as noted above.

Alternately, the original input question 310 can be used as a template to plug in the parallel elements from each novel tuple to thereby generate a novel training question to be associated with the novel answer. That is, the training question generation logic 395 may generate the training question by identifying the template of the initial training question and populating the question template with information from the identified elements in the portion of content. The question is then paired with the answer found in the portion of content for that question to thereby generate a question/answer pair. The question/answer pairs generated in this manner for each of the sibling occurrences of the repeatable pattern in the portion of content may then be added as entries in the ground truth data structure 398.

For example, if the answer to a training question, e.g., input question 310, is found in a table present in a portion of content, the repeatable pattern may be the relationship between columns and rows representing elements of the question and the answer to the question. As one example, if the question is "What are the most popular General Motors car models today?" and an answer is obtained from a table of sales figures for various car manufacturer car models in the year 2014, with the table having sections for various car manufacturers, rows for car model and a column of number of sales, the repeatable format may be the section=car manufacturer, row=model, and column=number of sales. Thus, if a subsequent question of the type "What are the most popular Ford car models today?" is submitted, a similar table for Ford cars may be identified and the repeatable pattern may be applied to identify the most popular Ford car model. Thus, for the training question "What are the most popular Ford car models today?" an answer is identified in the table and used to generate the sibling question/answer pair.

In generating the sibling question/answer pair entries in the ground truth data structure 398, the analysis of the training question 310 performed during question decomposition stage 330 may be used to identify the elements of the training question. For example, if the question is "Who is the CEO of Adobe Systems?", then a question template may be of the type Who is the <title> of <company>? Where "<title>" and "<company>" are elements found from the corpus of information 347 and may be populated using information from the corpus of content 347 so as to generate an additional training question to be added to the set of training questions 399 used to train the QA system pipeline 300. The question is formulated using the input question 310 as a template to generate the additional training questions whose answers are the answers specified by the corresponding question/answer pair entry in the ground truth data structure 398 found by applying the repeatable pattern to extract the answer from the portion of content. In some illustrative embodiments, an SME or other user is requested to map portions of the repeatable elements of the repeatable pattern to fields within the question template. The resulting template is used to automatically generate question and answer pairs from the content of the corpus by populating the fields of the template with information from the corpus and correlating the resulting question with an identified answer within the corpus. As a result, sibling question/answer pairs are thereby generated for inclusion in the ground truth data structure 398.

As discussed above, the identified sibling question/answer pairs that follow the same repeatable pattern may be automatically or semi-automatically added to the ground truth table data structure 398 and used to expand the set of training questions 399 for training the QA system pipeline 300. With an automated implementation, no additional verification is utilized before automatically creating an entry into the ground truth table data structure 398 for the question/answer pair or adding the training question to the set of training questions 399. In a semi-automated implementation, the sibling question/answer pairs may be presented to a SME or other human user for verification before adding the corresponding entry to the ground truth table data structure 398. If the SME/user verifies the question/answer pair, it is added as an entry into the ground truth data structure 398. If the SME/user does not verify the question/answer pair, it is discarded and not added to the ground truth data structure 398. Thus, additional question/answer pairs are generated and added to the ground truth table data structure 398 in an automated or semi-automated manner rather than having to have a SME manually enter, or identify within the corpus, all of the question/answer pairs that may be used for training the QA system pipeline 300. Thus, the ground truth table data structure 398 is automatically expanded with additional question/answer pairs which also expands the training question set 399 that may be utilized to train the QA system.

To further illustrate the way in which the pattern recognition logic 394 of the ground truth generation engine 390 operates to identify a repeatable pattern associated with an answer to an initial training question and applies that repeatable pattern to generate additional training questions and corresponding answers for inclusion in a training question set and ground truth data structure, reference is now made to FIG. 4. FIG. 4 shows an example portion of content that may be present in a corpus of information and which may be used to generate an answer to a training question in accordance with one illustrative embodiment. The portion of content shown in FIG. 4 is a webpage that provides information about the chief executive officers (CEOs) of various companies.

For the example scenario for illustrating the operation of the illustrative embodiments, it is assumed that the initial training question that is submitted to the QA system pipeline 300 is the question "Who is the current CEO of Adobe Systems?" with a candidate answer for this question having been identified as coming from the webpage shown in FIG. 4 which includes the table 400. The question is analyzed to extract its features and identify the elements of the question so as to generate a template for the question. In this case, the template would be of the type "Who is the current <title> of <company>?" with the answer template corresponding to this question being of the type <executive> is the <title> of <company>.

From the table 400, having annotated the webpage document as providing the answer to the question in the "Executive" column 420 of the table 400, the pattern recognition logic 394 operates to identify a repeatable pattern within the table. In this case, it is determined that the repeatable pattern within the table 400 comprises columns 410-430 with column 410 providing the company name, column 420 providing the answer, i.e. the executive's name, and column 430 providing the title for the executive. Columns 410 and 430 may be used to match to the question elements while column 420 provides the answer to the question. Thus, for the initial training question of "Who is the current CEO of Adobe Systems?", columns 410 and 430 are matched by elements of the question, i.e. "CEO" matches to column 430 while "Adobe Systems" matches to column 410. As a result, the answer to the training question is determined to be "Shantanu Narayen" with the formulation of the answer being of the type "Shantanu Narayen is the President and CEO of Adobe Systems."

This answer may be presented to a SME for verification. Assuming that the SME verifies that this is indeed the correct answer to the training question, the question/answer pair is created and stored in the ground truth data structure 398 and the training question is stored in the set of training questions 399. Moreover, the verification by the SME services as an input indicative of the verification of the repeatable pattern that has been identified and thus, the repeatable pattern, in response to the SME verification, is used to generate additional training questions and corresponding answers from the portion of content, i.e. the document of FIG. 4 and specifically table 400. It should be noted that in some illustrative embodiments, the SME involvement may be eliminated and instead, as long as the initial training question's answer matches a correct answer in the already existing ground truth data structure 398, the answer is automatically verified and the repeatable pattern is likewise automatically verified and may be used to generate additional training question/answer pairs.

Thus, having identified a repeatable pattern within the table 400, this pattern is used to generate additional training questions and corresponding answers so as to generate question/answer pairs for the ground truth data structure 398 and training questions for the set of training questions 399. Hence, for each entry in the table 400 an additional training question and corresponding answer may be generated and used to generate a question/answer pair and training question. As one example, an additional training question of "Who is the current CEO of Agenus?" may be generated with the corresponding answer being "Garo H. Armen is the current Founder, Chairman, CEO of Agenus." This training question and corresponding answer may be stored as a question/answer pair in the ground truth data structure 398 and the question may be stored in the set of training questions 399. It should be noted that, at the time that this training question is generated, it has not already been processed by the QA system pipeline 300. Thus, this additional training question will serve as a new training question when it is presented to the QA system pipeline 300 for processing and can be used to determine whether the annotators and other logic within the QA system pipeline 300 are properly operating and also provide output for generating weights and other values stored in the trained model.

It should be noted that in performing the repeatable pattern recognition in the table 400, the pattern recognition logic 394 may also identify further expansions of the training questions by identifying additional columns or rows that may be used to generate other versions of the training question that is submitted. For example, looking at the additional columns of the table 400, the pattern recognition logic 394 may identify a column of "Since" as corresponding to a time frame indicative of a starting time point. As a result, a question template may be generated that expands the initial training question of "Who is the current CEO of Adobe Systems?" to be "Who became CEO of Adobe Systems in 2007?", i.e. a question template of the type "Who became <title> of <company> in <since>?" A corresponding answer template of <executive> became<title> of <company> in <since> may also be generated. Natural language processing techniques may be applied to the portion of content, e.g., table 400, to identify such key terms and phrases and map them to corresponding question terms. Alternatively, when presenting the answer to the initial training question to the SME for verification, the SME may also be presented with the source of the question and, through a graphical user interface (GUI) or the like, may select other portions of the content, e.g., other cells within the table 400, to be used to generate additional training questions and mapping them to particular elements of a training question.

Thus, the set of training questions 399 may be expanded both column wise and row wise using the table 400 in FIG. 4 to thereby generate additional variants of the initial training question. For example, for column-wise expansion of the set of training questions, additional training questions of the type "Who is the current CEO of Accenture?" and "Who is the current Chairman of Aditya Birla Group?" may be generated using the example table 400. For row-wise expansions, the training question "Who because CEO of Accenture in 2011?" may be generated using the example table 400.

Moreover, additional more complex analysis of the portion of content may be implemented in the pattern recognition logic 394 or training question generation logic 396. For example, analysis of the information provided in table 400 may be performed to identify relationships between the various cells of the table to generate additional basis for question generation. For example, logic may be provided for accumulating cells or determining time lengths represented by cells of the table 400. As one example, an additional training question of "How many CEOs were educated at New York University?" may be generated with the answer being determined by looking at the table 400 and accumulating a number of CEOs whose education column 440 indicates they were educated at New York University. Similarly, a question of the type "Who is the longest-serving CEO of a notable company?" may be generated based on the table 400 due to the "Since" column 440 providing an initial time point and the current time point being used to calculate the "longest-serving" criteria of the question. Thus, the logic 394/396 may identify portions of the content which provide a basis for generation of additional question variants that are answerable by the portion of content. These question variants may also be presented the SME for verification or automatically added to the set of training questions 399 and ground truth data structure 398.

It should be noted that while FIG. 4 illustrates the operation of the illustrative embodiments with regard to a table structure 400 within a document of a corpus, the illustrative embodiments are not limited to such and may instead operate on any portion of content having a discernable repeatable pattern. Such portions of content may include list structures, bulleted lists, outlined data with section headings and sub-headings, and the like. FIG. 5 is an example diagram of another type of portion of content in which a repeatable pattern is discernable in association with an identified answer to a training question in accordance with one illustrative embodiment. The example portion of content shown in FIG. 5 is a web page formatted using an outline format with headings and sub-headings as well as bulleted lists.

The example shown in FIG. 5 may be used to answer a question of the type "What does ACU mean in transportation?" In generating an answer to this question, the web page in FIG. 5 may generating an answer of "Auto-Cycle Union" from the "transportation related" sub-section of the web page. This answer may be output to a SME who may then verify the answer to be correct for the training question such that the web page and sub-section are marked as having an answer to a training question and a corresponding question/answer pair is generated for the ground truth data structure.

In this example, the repeatable pattern identified in the document may be of the type sub-heading and answer. Thus, variants of the training question "What does ACU mean in transportation" may be generated for each of the other sub-headings, e.g., "What does ACU mean in Geography?", "What does ACU mean in Military?", etc. These variant training questions may be paired with a corresponding answer selected from the bulleted lists associated with the corresponding sub-heading by running the question through the QA system pipeline 300 and having it generate an answer from the web page, presenting it to the SME for verification, and then having the verified answers used to generate question/answer pairs in the ground truth data structure.

Figure 6:
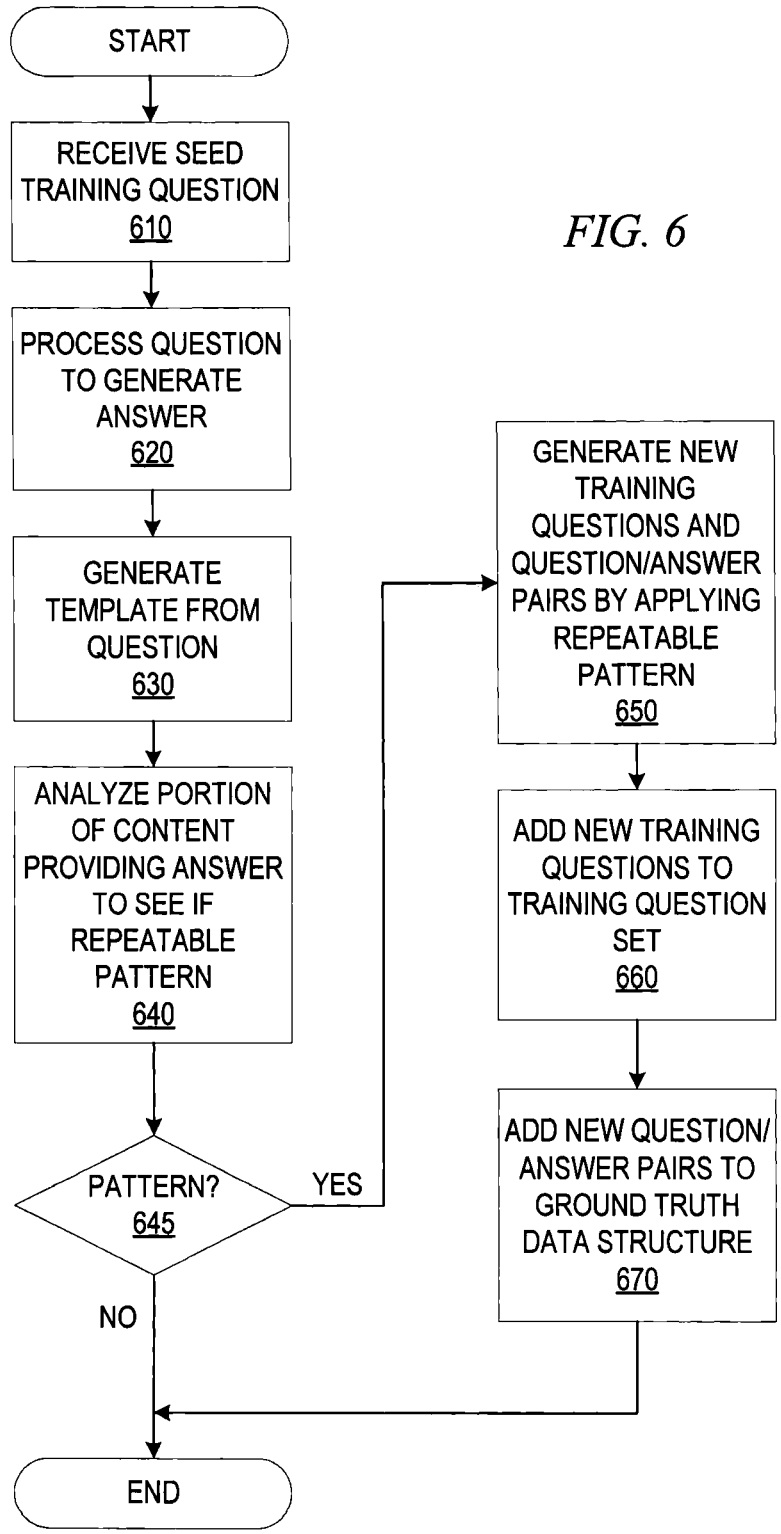
FIG. 6 is a flowchart outlining an example operation of a training question and ground truth expansion operation in accordance with one illustrative embodiment.

FIG. 6 is a flowchart outlining an example operation of a training question and ground truth expansion operation in accordance with one illustrative embodiment. As shown in FIG. 6, the operation starts with receipt of a seed training question for processing by the QA system pipeline (step 610). The training question is processed by the QA system pipeline to generate an answer to the training question from a portion of content in a corpus of information (step 620). The training question is further analyzed to identify elements of the training question and the elements are utilized to generate a template for the question (step 630). The portion of content is analyzed to determine if there is a repeatable pattern of content present in the portion of content that can be used to generate additional training questions and/or training question variants (step 640). It should be appreciated that, although not shown explicitly in FIG. 6, an additional operation that may be performed is to present the answer to the SME or other user for verification in which case the step 640 may only be performed in response to the SME or other user verifying the answer generated in step 620 as being a correct answer for the training question and the portion of content annotated as such.

If it is determined that there is a repeatable pattern present in the portion of content (step 645), e.g., a table, a list, a bulleted list, an outline formatted portion of content, and/or the like, then the repeatable pattern is used to generate a template for additional training question/answer pairs by providing the information for populating the question template and/or generate new variant question templates as well as the corresponding answers to these additional training questions (step 650). The resulting training questions are added to a training question set for training the QA system pipeline (step 660). The question/answer pair is added to the ground truth data structure for training of the QA system pipeline (step 670). The operation then terminates.

It should be appreciated that while the flowchart in FIG. 6 shows the operation terminating, the operation may in fact be repeated for each additional training question that is submitted to the QA system pipeline as desired so as to perform multiple levels of expansion of the training question set and the ground truth data structure. Moreover, it should be appreciated that the resulting training question set and ground truth data structure which are automatically or semi-automatically generated using the mechanisms of the illustrative embodiments, may be used to train the QA system pipeline and generate a trained model of weight values for annotators of the QA system pipeline and the like, so as to train the QA system pipeline to generate correct answers for input questions.

Thus, the illustrative embodiments provide mechanisms for expanding a training question set and a corresponding ground truth data structure for use in training a QA system pipeline. The expansion of the training question set and ground truth data structure may be performed automatically or semi-automatically with SME or user verification. The mechanisms of the illustrative embodiments leverage identifiable repeatable patterns within portions of content as a mechanism for automated generation of training questions and corresponding answers directly from the corpus. In this way, a SME or other user need not manually generate all of the entries in the training question set and ground truth data structure and instead need only provide the seed training question and ground truth answer for the seed training question which are then utilized to identify a repeatable pattern and automatically generate additional training questions and training question variants for fully training the QA system pipeline.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system having a processor and a memory and implementing a Question and Answer (QA) system, the method comprising:

receiving, by the QA system, a training question for processing by the QA system;

processing, by the QA system, the training question to generate an answer to the training question, from a portion of content in a corpus of information;

identifying, by the QA system, a repeatable pattern of content present in the portion of content in association with the answer to the training question;

applying, by the QA system, the repeatable pattern of content to other portions of content to generate at least one additional training question and at least one additional entry in a ground truth data structure to thereby expand a set of training questions and expand the ground truth data structure;

storing the expanded set of training questions and expanded ground truth data structure; and training the QA system using the expanded set of training questions and expanded ground truth data structure, wherein the portion of content is an unstructured natural language portion of content and the repeatable pattern of content is identified by identifying a structure within the unstructured natural language portion of content that comprises a plurality of entries, each entry having the repeatable pattern of content.

2. The method of claim 1, wherein identifying the repeatable pattern comprises applying one or more rules associated with a type of the portion of content, wherein the one or more rules specify a repeatable structure of the portion of content indicative of a repeatable pattern for identifying first elements of the at least one additional training question, and second elements of at least one additional answer to the at least one additional training question.

3. The method of claim 2, wherein the one or more rules specify metadata patterns indicative of a repeatable pattern associated with a group of elements of the portion of content.

4. The method of claim 1, wherein the portion of content comprises a document in a corpus of documents, and wherein the structure comprises at least one of a table data structure, a list data structure, bulleted data, or outlined data with headings and subheadings.

5. The method of claim 1, wherein applying the repeatable pattern of content to other portions of content to generate at least one additional training question and at least one additional entry in a ground truth data structure further comprises:
selecting, based on the repeatable structure of the portion of content, each element in the repeatable structure that is in a parallel position in the repeatable structure to the answer generated for the training question, to thereby generate selected elements; and
verifying each of the selected elements in the repeatable structure.

6. The method of claim 5, wherein verifying each of the selected elements in the repeatable structure comprises:
for each selected element performing at least one of bayesian reasoning or ontology based reasoning to infer a semantic type of the selected element;
evaluating whether a sufficient number of the selected elements are of a similar semantic type to a semantic type of the answer to the training question; and
storing each of the selected elements as additional answers in the at least one additional answer in response to the evaluation indicating that a sufficient number of the selected elements are of a similar semantic type to the semantic type of the answer to the training question.

7. The method of claim 6, wherein applying the repeatable pattern of content to other portions of content to generate at least one additional training question and at least one additional entry in a ground truth data structure further comprises:
identifying relation terms in the training question;
searching the portion of content for the relation terms;
determining a structural relation of the repeatable structure based on an identification of the relation terms in the portion of content;
verifying the structural relation of the repeatable structure returns semantically similar answers to the answer to the training question; and
storing tuples of relation terms and the additional answers in response to the structural relation being verified.

8. The method of claim 7, wherein applying the repeatable pattern of content to other portions of content to generate at least one additional training question and at least one additional entry in a ground truth data structure further comprises, for each stored tuple:
converting the stored tuples to a natural language question; and
storing an entry in the ground truth data structure correlating the natural language question with the additional answer associated with the tuple.

9. The method of claim 1, wherein the repeatable pattern of content is a portion of a table structure, and wherein applying the repeatable pattern of content to other portions of content to generate at least one additional training question and at least one additional entry in a ground truth data structure further comprises:
selecting, based on the portion of the table structure, each element in the portion of the table structure that is in a parallel position, in the table structure, to the answer generated for the training question, to thereby generate selected elements; and
verifying each of the selected elements in the repeatable structure.

10. A computer program product comprising a computer readable storage medium having a computer readable program stored therein, wherein the computer readable program, when executed on a computing device implementing a Question and Answer (QA) system, causes the computing device to:
receive, by the QA system, a training question for processing by the QA system;
process, by the QA system, the training question to generate an answer to the training question, from a portion of content in a corpus of information;
identify, by the QA system, a repeatable pattern of content present in the portion of content in association with the answer to the training question;
apply, by the QA system, the repeatable pattern of content to other portions of content to generate at least one additional training question and at least one additional entry in a ground truth data structure to thereby expand a set of training questions and expand the ground truth data structure; and
store the expanded set of training questions and expanded ground truth data structure; and
train the QA system using the expanded set of training questions and expanded ground truth data structure, wherein the portion of content is an unstructured natural language portion of content and the repeatable pattern of content is identified by identifying a structure within the unstructured natural language portion of content that comprises a plurality of entries, each entry having a same pattern of content.

11. The computer program product of claim 10, wherein the computer readable program further causes the computing device to identify the repeatable pattern at least by applying one or more rules associated with a type of the portion of content, wherein the one or more rules specify a repeatable structure of the portion of content indicative of a repeatable pattern for identifying first elements of the at least one additional training question, and second elements of at least one additional answer to the at least one additional training question.

12. The computer program product of claim 11, wherein the one or more rules specify metadata patterns indicative of a repeatable pattern associated with a group of elements of the portion of content.

13. The computer program product of claim 10, wherein the portion of content comprises a document in a corpus of documents, and wherein the structure comprises at least one of a table data structure, a list data structure, bulleted data, or outlined data with headings and subheadings.

14. The computer program product of claim 11, wherein the computer readable program further causes the computing device to apply the repeatable pattern of content to other portions of content to generate at least one additional training question and at least one additional entry in a ground truth data structure at least by:
selecting, based on the repeatable structure of the portion of content, each element in the repeatable structure that is in a parallel position in the repeatable structure to the answer generated for the training question, to thereby generate selected elements; and
verifying each of the selected elements in the repeatable structure.

15. The computer program product of claim 14, wherein verifying each of the selected elements in the repeatable structure comprises:
for each selected element performing at least one of bayesian reasoning or ontology based reasoning to infer a semantic type of the selected element;
evaluating whether a sufficient number of the selected elements are of a similar semantic type to a semantic type of the answer to the training question; and
storing each of the selected elements as additional answers in the at least one additional answer in response to the evaluation indicating that a sufficient number of the selected elements are of a similar semantic type to the semantic type of the answer to the training question.

16. The computer program product of claim 15, wherein the computer readable program further causes the computing device to apply the repeatable pattern of content to other portions of content to generate at least one additional training question and at least one additional entry in a ground truth data structure at least by:
identifying relation terms in the training question;
searching the portion of content for the relation terms;
determining a structural relation of the repeatable structure based on an identification of the relation terms in the portion of content;
verifying the structural relation of the repeatable structure returns semantically similar answers to the answer to the training question; and
storing tuples of relation terms and the additional answers in response to the structural relation being verified.

17. The computer program product of claim 16, wherein the computer readable program further causes the computing device to apply the repeatable pattern of content to other portions of content to generate at least one additional training question and at least one additional entry in a ground truth data structure at least by, for each stored tuple:
converting the stored tuples to a natural language question; and
storing an entry in the ground truth data structure correlating the natural language question with the additional answer associated with the tuple.

18. The computer program product of claim 10, wherein the repeatable pattern of content is a portion of a table structure, and wherein the computer readable program further causes the computing device to apply the repeatable pattern of content to other portions of content to generate at least one additional training question and at least one additional entry in a ground truth data structure at least by:
selecting, based on the portion of the table structure, each element in the portion of the table structure that is in a parallel position, in the table structure, to the answer generated for the training question, to thereby generate selected elements; and
verifying each of the selected elements in the repeatable structure.

19. An apparatus comprising:
a processor; and
a memory coupled to the processor, wherein the memory comprises instructions which, when executed by the processor, cause the processor to:
receive a training question for processing by a Question and Answer (QA) system associated with the apparatus;
process the training question to generate an answer to the training question, from a portion of content in a corpus of information;
identify a repeatable pattern of content present in the portion of content in association with the answer to the training question;
apply the repeatable pattern of content to other portions of content to generate at least one additional training question and at least one additional entry in a ground truth data structure to thereby expand a set of training questions and expand the ground truth data structure; and
store the expanded set of training questions and expanded ground truth data structure; and
train the QA system using the expanded set of training questions and expanded ground truth data structure, wherein the portion of content is an unstructured natural language portion of content and the repeatable pattern of content is identified by identifying a structure within the unstructured natural language portion of content that comprises a plurality of entries, each entry having a same pattern of content.

* * * * *